United States Patent
Katz et al.

(10) Patent No.: US 11,604,825 B2
(45) Date of Patent: Mar. 14, 2023

(54) ARTIFICIAL INTELLIGENCE MODEL FOR PREDICTING PLAYBACK OF MEDIA DATA

(71) Applicant: NICE LTD., Ra'anana (IL)

(72) Inventors: Natan Katz, Tel Aviv (IL); Shem Tov Shay Levy, Raanana (IL); Tal Haguel, Petach Tikva (IL)

(73) Assignee: NICE LTD., Ra'anana (IL)

( * ) Notice: Subject to any disclaimer, the term of this patent is extended or adjusted under 35 U.S.C. 154(b) by 388 days.

(21) Appl. No.: 16/927,388

(22) Filed: Jul. 13, 2020

(65) Prior Publication Data

US 2022/0012281 A1    Jan. 13, 2022

(51) Int. Cl.
| | |
|---|---|
| *G06F 16/735* | (2019.01) |
| *H04N 21/45* | (2011.01) |
| *H04N 21/414* | (2011.01) |
| *G06N 3/08* | (2023.01) |
| *G06N 3/045* | (2023.01) |

(52) U.S. Cl.
CPC ........... *G06F 16/735* (2019.01); *G06N 3/045* (2023.01); *G06N 3/08* (2013.01); *H04N 21/41407* (2013.01); *H04N 21/4532* (2013.01)

(58) Field of Classification Search
CPC ...... G06F 16/735; G06N 3/0454; G06N 3/08; H04N 21/41407; H04N 21/4532
See application file for complete search history.

(56) References Cited

U.S. PATENT DOCUMENTS

| | | | | |
|---|---|---|---|---|
| 9,959,506 | B1* | 5/2018 | Karppanen | G06F 16/9574 |
| 9,961,202 | B2* | 5/2018 | Bellosi | H04M 3/5175 |
| 10,129,362 | B2* | 11/2018 | Toksoz | H04L 67/5683 |
| 2001/0055372 | A1* | 12/2001 | Glowny | G11B 31/00 |
| 2006/0277271 | A1* | 12/2006 | Morse | H04L 67/5681 |
| | | | | 709/227 |
| 2007/0013968 | A1* | 1/2007 | Ebaugh | G06F 16/2228 |
| | | | | 707/E17.084 |
| 2010/0005084 | A1* | 1/2010 | Nguyen | H04N 21/4331 |
| | | | | 707/E17.014 |
| 2014/0179441 | A1* | 6/2014 | Morrison, III | A63F 9/24 |
| | | | | 463/43 |
| 2015/0193395 | A1* | 7/2015 | Nicolaou | G06F 16/24578 |
| | | | | 707/726 |
| 2017/0124447 | A1* | 5/2017 | Chang | G06F 40/30 |
| 2019/0278870 | A1* | 9/2019 | Novielli | G06N 20/00 |

* cited by examiner

*Primary Examiner* — Hosain T Alam
*Assistant Examiner* — Robert F May
(74) *Attorney, Agent, or Firm* — Haynes and Boone, LLP (57) ABSTRACT

A system is provided to predict requested playbacks of media files by users from a media storage system. The system includes a processor and a computer readable medium operably coupled thereto, to perform predictive playback operations which include accessing an AI model and a media file comprising metadata associated with generating the media file, generating a predictive score for a playback of the media file based on the AI model and the metadata, comparing the predictive score to a threshold required to transcode the media file into a playback format prior to the playback, predicting the playback based on the comparing, determining a predicted playback time of the media file based on the metadata for the media file, and transcoding the media file into the playback format prior to the predicted playback time.

20 Claims, 7 Drawing Sheets

FIG. 1

Training Metadata Table 1000

| Requester ID 1002 | Group 1004 | Request Time 1006 | Call Duration 1008 | Screen Resolution 1010 | |
|---|---|---|---|---|---|
| Alice | Sales | Sunday 20:00 | 5 minutes | HD | } 1012 |
| Bob | Sales | Sunday 20:30 | 7 minutes | FHD | } 1014 |
| Chris | Legal | Sunday 18:30 | 5 minutes | None | } 1016 |
| Bob | Sales | Sunday 20:00 | 10 minutes | None | } 1018 |

ARTIFICIAL INTELLIGENCE MODEL FOR PREDICTING PLAYBACK OF MEDIA DATA

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to artificial intelligence (AI) systems and models, and more specifically to a system and method for an AI system trained to predict if users may request playback of media files, such as audio, video, and/or audiovisual content.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized (or be conventional or well-known) in the prior art. The subject matter in the background section merely represents different approaches, which in and of themselves may also be inventions.

During use of different work systems, such as customer relationship management (CRM) systems, organizational operations systems, information systems, and the like, media files and other media data may be recorded of particular interactions between two or more entities. These entities may correspond to individual users or groups of users, as well as automated systems including chatbots, interactive voice response (IVR) systems, and the like. For example, two or more users may interact and record audio, visual, and/or audiovisual content. These recordings may be compacted to save storage space in a database system of the organization, or with an external service provider that assists in media data recording and/or storage. Since a small percentage (~5-10% with certain entities) of files are actually later retrieved and played back, compression of data into smaller sizes is beneficial to storage size and cost.

However, when the media data is later retrieved for playback, the corresponding recording files may not be capable of being played back without decoding and/or transcoding the data for a media player. For example, with a standard web player, such as an HTML5 video player utilized for website video playback, a compressed media file may not be playable. Decoding and decompressing data may take time and therefore the compressed media file may not be immediately accessible for playback. Similarly, transcoding of a phone call including voice data from Nonnegative Matrix Factorization (NMF) and/or proprietary codecs to a format for playback (e.g., MP4 format) may also take a significant amount of time. Thus, playback of the voice call is only available after the transcoding is completed. This leads to significant time losses for systems and users. It therefore is desirable to predict which media files may be played back while retaining the benefits of data compression.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In the figures, elements having the same designations have the same or similar functions.

DETAILED DESCRIPTION OF PREFERRED EMBODIMENTS

This description and the accompanying drawings that illustrate aspects, embodiments, implementations, or applications should not be taken as limiting—the claims define the protected invention. Various mechanical, compositional, structural, electrical, and operational changes may be made without departing from the scope of this description and the claims. In some instances, well-known circuits, structures, or techniques have not been shown or described in detail as these are known to one of ordinary skill in the art.

In this description, specific details are set forth describing some embodiments consistent with the present disclosure. Numerous specific details are set forth in order to provide a thorough understanding of the embodiments. It will be apparent, however, to one of ordinary skill in the art that some embodiments may be practiced without some or all of these specific details. The specific embodiments disclosed herein are meant to be illustrative but not limiting. One of ordinary skill in the art may realize other elements that, although not specifically described here, are within the scope and spirit of this disclosure. In addition, to avoid unnecessary repetition, one or more features shown and described in association with one embodiment may be incorporated into other embodiments unless specifically described otherwise or if the one or more features would make an embodiment non-functional.

Overview

For an artificial intelligence (AI) system trained for media file playback prediction, methods, data structures, and systems are provided for to train and utilize an AI model to predict whether one or more users may request playback of media data at a future time. A service provider, such as a CRM system, customer service system, business management system, organizational management system, or other networked service provider, may record media content, files, and data (e.g., audio, visual, and/or audiovisual content) of interactions between different users and/or entities. This may include phone calls, video conferencing, audio/video streaming services, and the like. For example, different internal and/or external users of a service provider may interact over end-to-end communications that may be recorded by the service provider for later review and use. When recording and storing media files, the media files may be compacted and compressed, such as encoded into smaller file sizes, in order to optimize storage. When a media file is later played back, the media file is required to be decoded and decompressed, as well as possibly transcoded into a playable format for media players, which consumes time and computing resources. There may be significantly time delays where a media file is large, such as for a long recording.

A media file is associated with a set of metadata describing the media file and underlying data. For example, media files may be associated with different parameters, including participants to the recording (e.g., endpoints and/or users on a phone call), a group identification associated with the media file and/or requester of the media file (e.g., an identifier of particular division or sub-division within an organization), a start time and/or duration of the recording, a screen resolution for recorded video, and the like. For previous playbacks of media files, the metadata for the media files may also include an identifier of the requester of the playback (e.g., a globally unique identifier (GUID) or universally unique identifier (UUID)), a time of the requested playback, and/or a number of playbacks or "hits" to the stored media file. Using the metadata, an AI model for predicting requested playbacks of media files may be trained. The metadata may be converted to numerical representations and/or vectors, for example, using word/phrase embeddings and/or one-hot encoding, that converts categorical data to numbers and integers. The AI model may be trained using a deep learning algorithm or technique to determine the individual layers and output classifications. Nonlinear activation functions may also be used during training, including a rectified linear unit (ReLU) function, a leaky ReLU function, a TanH function, or a combination thereof.

Thereafter, once the AI model is trained, the AI model may be implemented in an AI system for media file playback prediction. For predictive playback techniques, the AI system may then analyze additional media files, such as new or incoming media files for a particular customer or entity of the service provider, as well as past stored media files. The additional media files may be analyzed using their metadata to score the media files for their potential for future playback. For example, the additional media files may receive a score, value, or analysis using the AI system of whether one of more of the media file may be played back at a future time. This score may be based on a calculated distance between a vector of a particular media file and the trained vectors for past playbacks of media files. The AI system may implement a threshold to the score that is required to be met or exceed for predicting playback of a media file. This analysis by the AI system may be performed at particular time intervals, where the media files and/or any new media files are again analyzed in the subsequent time period. This time period and the threshold may be configurable based on storage space, size, and cost, as well as processing load cost for analysis of the media files by the AI system.

If a particular file fails to exceed the threshold when analyzed and scored by the AI system, the media file is not predicted and prepared for playback. The media file may still be accessible but required to be decoded/transcoded as needed. However, if a media file is predicted for playback, the AI system may then determine a predicted playback time, for example, based on other similar past playbacks of media files (e.g., for the same media file, another similar media file based on the same or similar metadata, the requesting user, the group for the media file, and the like). The media file may then be prepared and transcoded in preparation for the predicted playback time. Thereafter, when a user requests playback of the media file, the media file is already decompressed and/or transcoded so that the media file is available for immediate playback. Further, the AI system may utilize the predicted playback of the media file, and the media files corresponding metadata, to retrain and update the AI model for predictive playback.

The embodiments described herein provide methods, computer program products, and computer database systems for algorithmic predictive playback model determination. The service provider system associated with or incorporating the predictive playback AI system may therefore prepare media files to users and other entities prior to receiving a request for playback of a media file, thereby reducing preparation and processing times. For example, the online system may provide a portal that is accessible to provide a particular media file previously prepared based on the predictive playback AI system. Once a predictive playback AI model is established, the predictive playback AI system may provide prepared media files in a faster and more convenient manner.

According to some embodiments, in a service provider computing system accessible by a plurality of separate and distinct organizations, a predictive playback AI model is provided for identifying, predicting, and designating particular media files for preparation by a predicted playback time, thereby optimizing media file playback, reducing data processing cost and resources, and providing faster processing and playback times for media files.

Example Environment

Figure 1:
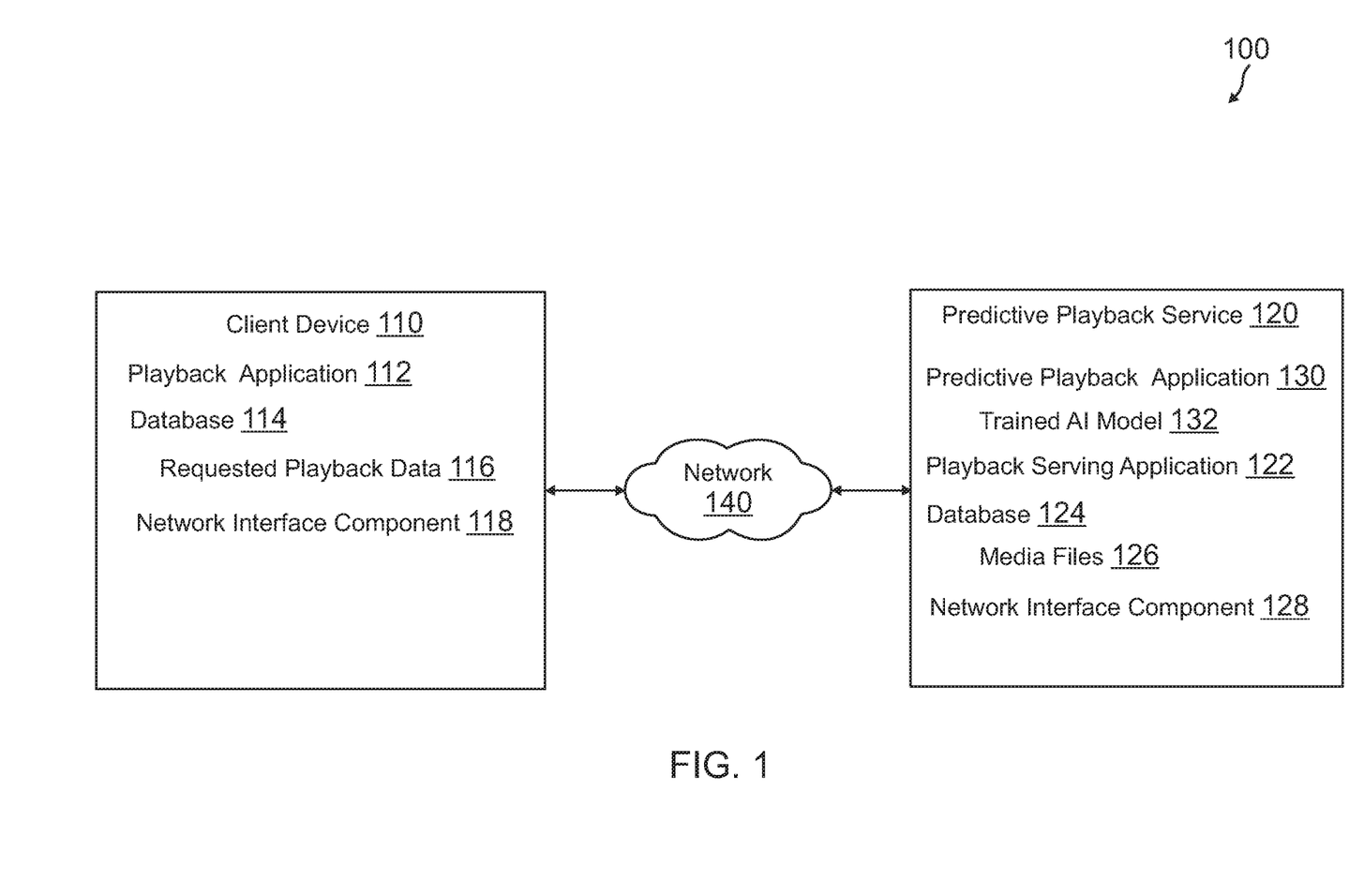
FIG. 1 is a simplified block diagram of a networked environment suitable for implementing the processes described herein according to an embodiment.

The system and methods of the present disclosure can include, incorporate, or operate in conjunction with or in the environment of a media playback service, system, database, and portal, which may include web and device applications used for playback of media content and files. FIG. 1 is a block diagram of a networked environment suitable for implementing the processes described herein according to an embodiment. As shown, an environment 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided, by such devices and/or servers may be combined or separated for a given embodiment and may be performed by a greater number or fewer number of devices and/or servers. One or more devices and/or servers may be operated and/or maintained by the same or different entities.

FIG. 1 illustrates a block diagram of an example environment 100 according to some embodiments. Environment 100 may include client device 110 and a predictive playback service 120 that interact to provide automated recommendation, selection, and/or preparation of media files prior to anticipated or predicted playback times. In other embodiments, environment 100 may not have all of the components listed and/or may have other elements instead of, or in addition to, those listed above. In some embodiments, the environment 100 is an environment in which preparation of media files for playback is performed in a predictive process prior to potential playback. A client device 110 may be any machine or system that is used by a user to request and perform playback of a media file. Client device 110 can be a handheld computing device, a mobile phone, a laptop computer, a notepad computer, a work station, and/or a network of computing devices. As illustrated in FIG. 1, client device 110 might interact via a network 140 with predictive playback service 120, which predicts future playback requests of media files and prepares the media files prior to the predicted playback times.

Client device 110 may be utilized in order to initially request playback of one or more media files stored to predictive playback service 120 and/or another database system associated with predictive playback service 120. For example, client device 110 and/or other client devices, servers, or online platforms may initially request playback of certain stored media files, which may generate initial training data. In this regard, a playback application 112 of client device 110 may be used to request playback of one or more of media files 126 stored to database 124 of predictive playback application 130 via a playback servicing application 122. Playback serving application 122 may access the requested media file of media files 126 from a database 124 and prepare the media file for playback through playback application 112. Once decompressed and/or transcoded, the requested media file of media files 126 may be provided back to client device 110 by playback service application 122 and played through playback application 112, such as an HTML5 video player used within a webpage and web browser, a Flash media player, media player applications (e.g. Windows Media Player, VLC media player, etc.), or the like. The prepared media file may be stored locally as requested playback data 116 to a database 114 of client device 110 and/or streamed directly via the media player of playback application 112.

Thereafter, predictive playback service 120 may generate one or more tables of training data for the requested playbacks based on metadata for the requested playbacks. Metadata includes descriptive and identifying data associated with generating and utilizing media files 126, including data associated with recording and creating media files 126, storing media files 126, and/or playing media files 126. For example, each of media files 126 may include or be associated with metadata including data variables, characteristics, and other data specifications (e.g., data input, files, or other data structures). The data specification may be designated by predictive playback service 120 and/or another entity or service performing the recordation, storage, and use of media files 126. In this regard, the data specification may be one or a plurality of different parameters, definitions, and other information or metadata that describes a data file and corresponding data.

Metadata may be based on and/or determined from the underlying media data from media files 126. In this regard, an exemplary media file that was requested to be played back may include metadata having a request token, a segment identifier (ID), a participant list, a recording list, a playback request type, a playback request time, or any combination thereof. A request token may include a GUID, UUID, or other ID specifically identifying the user (or other entity, such as a group of users) that requested a playback of a media file. A segment ID may represent the media file, such as an ID of the media file and corresponding playback request. A participant list may include information of the participants to the underlying recording and media file, such as those users involved in a phone call or video conference. A recording list may include information that describes the recording. This may include a. a media type for voice/screen ID or identification of relevant recordings; b. information for the recording, such as stereo characteristics and/or a session ID; c. resolution of the screen if visual media is recorded; d. a recorder identifier for the relevant recorder of the media file; e. a file path for the media file and recording; f. a start time of the recording for the media file; or any combination thereof. A playback request type may correspond to the type of playback request, such as a play request, a search request, and the like. Additionally, a playback request time may include data of when the playback request was made. Additional metadata may also correspond to a size, data length, compression type, video compression or parameter, image compression or parameter, or other specification of media files 126.

Figure 2:
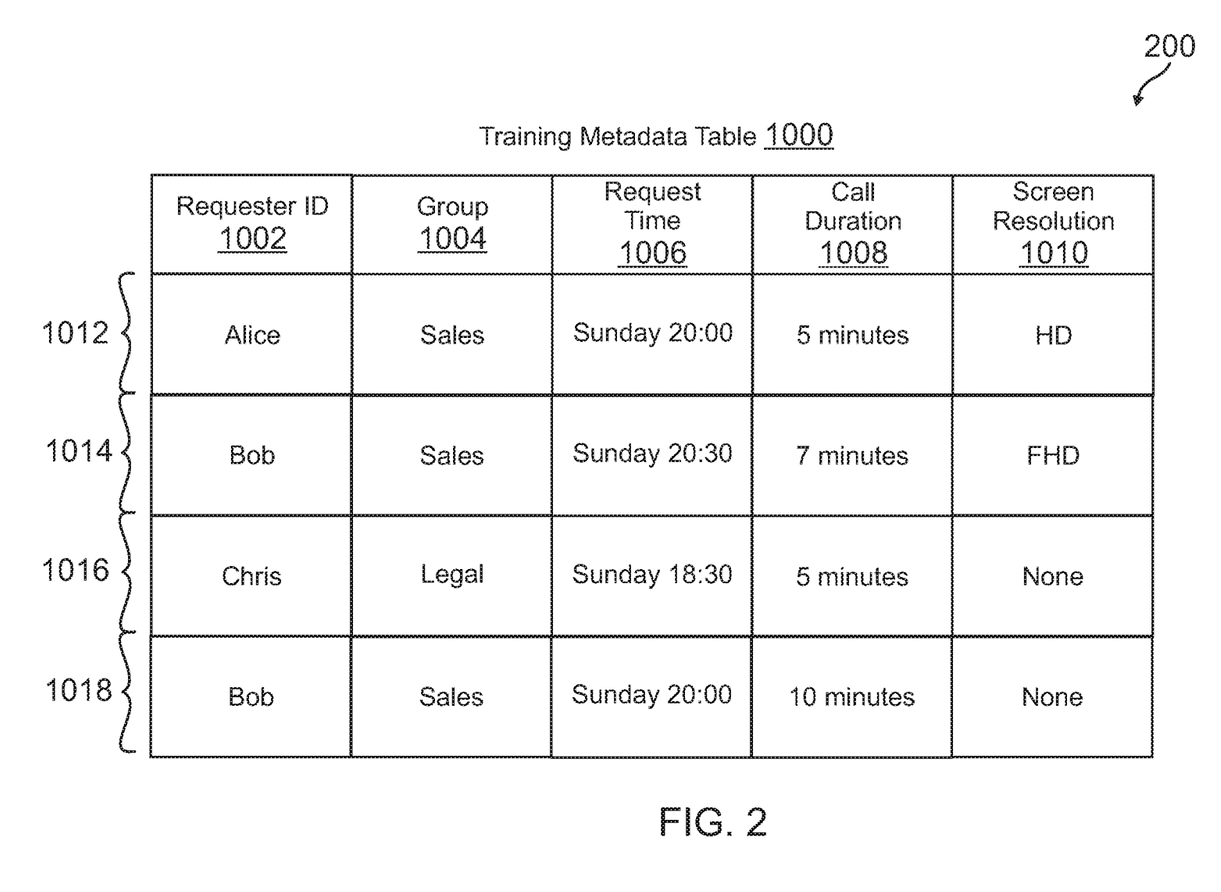
FIG. 2 is a simplified diagram of metadata used to train an AI model for a predictive playback AI system to predict requests for playback of media data according to some embodiments.

Thus, using the metadata for data structures, one or more metadata tables may be utilized in the training of trained AI model 132. A metadata table may include metadata for individual ones of media files 126 organized by an identifier of the requester of a playback, participants to the individual ones of media files 126, an organizational group or division for the requester of playback of the individual ones of media files 126, a time the recording started, a duration of the recording, a screen resolution for recorded video, a number of playbacks hits, and the like. An exemplary set of training data is shown in FIG. 2. Additionally, one or more data conversion steps may be used to convert categorical and/or unstructured data to numerical representations used to train an AI model, such as embeddings and/or one-hot encoding. This allows the corresponding training data to be utilized as numerical representations that may provide different training, weights, and values at different nodes within trained AI model 132. Although the aforementioned examples are types of metadata that may be used as training data in one or more tables, additional metadata and data characteristics for media files 126 may also be used. Such metadata tables may then be used as training data for a trained AI model 132 implemented by a predictive playback application 130.

Figure 6:
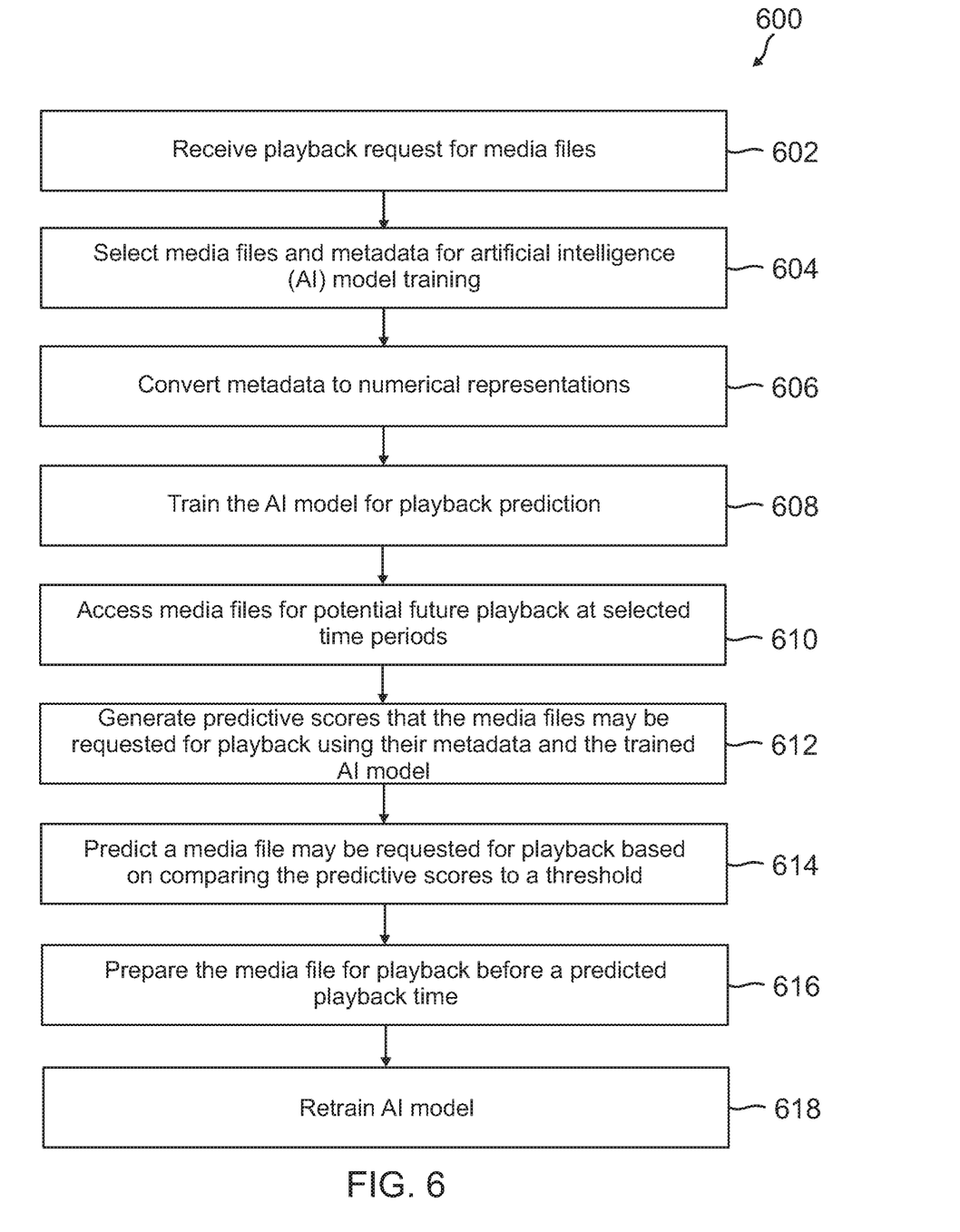
FIG. 6 is an exemplary flowchart for an AI model for predicting playback of media data according to some embodiments.

Using the training data tables of the metadata, trained AI model 132 is generated and determined, for example, using one or more AI algorithms. The AI algorithms may include different machine learning (ML) and/or neural network (NN) algorithms and/or techniques for training connected neural layers within an AI model. A deep NN (DNN) may be used in certain embodiments of trained AI model 132. Activation functions may also introduce non-linearity when mapping and determining the output of a particular node, including the output of trained AI model 132, for example, by calculating a weighted sum and introducing bias to that sum. In this regard, a ReLU function, a leaky ReLU function, or a TanH function may be used when determining activations of certain nodes, including the output nodes. Training of the nodes and layers of an AI model is shown in FIG. 6.

After generating and determining trained AI model 132 using the selected AI algorithm and technique, predictive playback service 120 implements trained AI model 132 with predictive playback application 130 in order to provide predictive playback operations with media files 126. Thus, when one or more media files are stored by predictive playback service 120 and/or another affiliated database system for media file storage, the media file(s) and associated metadata may be stored to database 124 and/or another database system, for example, with media files 126. Thereafter, at certain time intervals, predictive playback application 130 may process media files 126 using trained AI model 132 to determine whether to preprocess and prepare one or more of media files 126 in a predictive manner prior to a potential playback time of the selected media files. Media files 126 may be grouped based on organizational groups, customers, or requesting entities that request playback of media files 126. For example, a company may be a customer of predictive playback service 120 for media data recording and playback, which may utilize predictive playback application 130 to preprocess and load one or more of media files 126 in a predictive manner for fast delivery and playback. Determination of the time interval to iterate through associated ones of media files 126 may then be done by the requesting entity, for example, based on different preferences, costs, allocated resources, and/or available storage and data processing limitations. Client device 110 may correspond to a device of the requesting entity.

At the designated time interval, predictive playback application 130 may then iterate through the selected ones of media files 126 associated with the requesting entity. Trained AI model 132 may analyze the metadata of each one of the selected media files and provide a corresponding output or predictive score used to determine whether to prepare each of the selected media files for playback. In this regard, metadata of the selected media files is prepared, such as by obtaining numerical data from the metadata and converting categorical and/or unstructured data from the metadata to numerical representations. The prepared metadata is then utilized as input to trained AI model 132, which provides an output via predictive playback application 130. This output may correspond to a score or value that is compared to a threshold to determine whether preparation of one or more of the selected media files is desirable and predicted.

For example, if a media file's score meets or exceeds the threshold, the media file is predicted for potential future playback. Predictive playback application 130 may then determine a predicted time of playback based on the training metadata for the previous playback times of media files. The previous playback times may be associated with the requester of playback for the media file, a duration of the media file, a start time of the media file, an organizational group of the requester and/or media file, or any combination thereof. For example, for a particular organizational group, those media files predicted for playback may be required to be prepared 19:00 on a Sunday as that is the earliest time for playback of media files by members of that organizational group. Predictive playback application 130 may then iterate through some or all of media files 126 in this manner and may repeat as required based on the time interval for processing media files 126 for predictive playback. Additionally, trained AI model 132 may be retrained as necessary based on the predicted ones of media files 126 for playback. Trained AI model 132 may be global for all requesting entities of predictive playback service 120 or may be trained for specific customers, organizations and/or organizational groups, or requesting entities of media file playback. Thus, retraining may be global or specifically tailored to the needs of particular requesting entities.

Once a media file has been designated for preparation by a predicted time, playback serving application 122 may access the media file from database 124 prior to the predicted time (and with sufficient decoding/transcoding time for the media file). The media file may then be prepared by decompressing and/or transcoding the media file. Thereafter, a user of client device 110 may utilize playback application 112 to perform playback of the preprocessed media file in order to provide playback in a faster and more responsive manner. In some embodiments, the users of client device 110 may differ in their respective capacities, and the capacity of a particular client device 110 might be determined by applications, permissions, and profiles for the current user. Thus, different users will have different capabilities and perform different playback events with regard to accessing and playing media files 126, for example, by different access levels to media files 126 for playback. However, this is not mandatory, and it is understood that client device 110 may generally have certain capacities that are universal to users, entities, or other clients (thereby not specific to operations submitted for processing by predictive playback service 120).

Client device 110 may execute a web-based client that accesses a web-based application for predictive playback service 120, or may utilize a rich client, such as a dedicated resident application, to access predictive playback service 120. Client device 110 may utilize one or more application programming interfaces (APIs) to access and interface with predictive playback service 120 in order to request playback of media files 126. Thus, playback application 112 can be used to access data and applications hosted by predictive playback service 120 and to perform searches on stored data, for example, through providing a user interface to a user (e.g., a GUI output) or via an API of playback application 112. Interfacing with predictive playback service 120 may be provided through playback application 112 and may include data stored to database 114, such as requested playback data 116. Predictive playback service 120 may process and provide data through predictive playback application 130 and/or playback serving application 122 using trained AI model 132 and/or media files 126, respectively. Database 124 of predictive playback service 120 may store data associated with media files 126, including media file metadata and metadata tables.

Client device 110 might communicate with predictive playback service 120 using TCP/IP and, at a higher network level, use other common Internet protocols to communicate, such as hypertext transfer protocol (HTTP or HTTPS for secure versions of HTTP), file transfer protocol (FTP), wireless application protocol (WAP), etc. Communication between client device 110 and predictive playback service 120 may occur over network 140 using a network interface component 118 of client device 110 and a network interface component 128 of predictive playback service 120. In an example where HTTP/HTTPS is used, client device 110 might include an HTTP/HTTPS client commonly referred to as a "browser" for sending and receiving HTTP//HTTPS messages to and from an HTTP//HTTPS server, such as predictive playback service 120 via network interface component 118. Similarly, predictive playback service 120 may host an online platform accessible over network 140 that communicates information to and receives information from client device 110 via network interface component 128. Such an HTTP/HTTPS server might be implemented as the sole network interface between client device 110 and predictive playback service 120, but other techniques might be used as well or instead. In some implementations, the interface between client device 110 and predictive playback service 120 includes load sharing functionality. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

Client device 110 may utilize network 140 to communicate with predictive playback service 120, which is any network or combination of networks of devices that communicate with one another. For example, the network can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the Internet. However, it should be understood that the networks that the present embodiments might use are not so limited, although TCP/IP is a frequently implemented protocol.

According to one embodiment, predictive playback service 120 is configured to provide webpages, forms, applications, data, and media content to client device 110 and/or to receive data from client device 110. In some embodiments, predictive playback service 120 may be provided or implemented in a server environment and/or cloud environment, which may be accessible through one or more APIs with or without a correspond graphical user interface (GUI) output. Predictive playback service 120 further provides security mechanisms to keep data secure. Additionally, the term "server" is meant to include a computer system, including processing hardware and process space(s), and an associated storage system and database application (e.g., object-oriented data base management system (OODBMS) or relational database management system (RDBMS)). It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Several elements in the system shown in FIG. 1 include elements that are explained briefly here. For example, client device 110 could include a desktop personal computer, workstation, laptop, notepad computer, PDA, cell phone, or any wireless access protocol (WAP) enabled device or any other computing device capable of interfacing directly or indirectly to the Internet or other network connection. Client device 110 may also be a server or other online processing entity that provides functionalities and processing to other client devices or programs, such as online processing entities that provide services to a plurality of disparate clients.

Client device 110 may run an HTTP/HTTPS client, e.g., a browsing program, such as Microsoft's Internet Explorer browser, Netscape's Navigator browser, Opera's browser, or a WAP-enabled browser in the case of a cell phone, notepad computer, PDA or other wireless device, or the like. According to one embodiment, client device 110 and all of its components are configurable using applications, such as a browser, including computer code run using a central processing unit such as an Intel Pentium® processor or the like. However, client device 110 may instead correspond to a server configured to communicate with one or more client programs or devices, similar to a server corresponding to predictive playback service 120 that provides one or more APIs for interaction with client device 110.

Thus, client device 110 and/or predictive playback service 120 and all of their components might be operator configurable using application(s) including computer code to run using a central processing unit, which may include an Intel Pentium® processor or the like, and/or multiple processor units. A server for client device 110 and/or predictive playback service 120 may correspond to Window®, Linux®, and the like operating system server that provides resources accessible from the server and may communicate with one or more separate user or client devices over a network. Exemplary types of servers may provide resources and handling for business applications and the like. In some embodiments, the server may also correspond to a cloud computing architecture where resources are spread over a large group of real and/or virtual systems. A computer program product embodiment includes a machine-readable storage medium (media) having instructions stored thereon/in which can be used to program a computer to perform any of the processes of the embodiments described herein utilizing one or more computing devices or servers.

Computer code for operating and configuring client device 110 and/or predictive playback service 120 to intercommunicate and to process webpages, applications and other data and media content as described herein are preferably downloaded and stored on a hard disk, but the entire program code, or portions thereof, may also be stored in any other volatile or non-volatile memory medium or device, such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

Predictive Playback Model

FIG. 2 is a simplified diagram of metadata used to train an AI model for a predictive playback AI system to predict requests for playback of media data according to some embodiments. Environment 200 of FIG. 2 includes a training metadata table 1000 used to train an AI model and system for predictive playback, such as trained AI model 132 used by predictive playback application 130 discussed in reference to environment 100 of FIG. 1. In this regard, environment 200 displays an exemplary table of training data generated from user interactions with a media playback system, for example, when requesting playback of media files (e.g., recordings of phone calls, video conferences, and the like).

In environment 200, training metadata table 1000 is shown with five columns of training data utilized to train an AI model, such as a DNN trained using a deep learning algorithm and technique. Although five columns are shown, additional metadata and therefore columns of training data may also be used, including participants to the recording, hit amount of media file playbacks, and the like. In a first column, a requester ID 1002 is shown as the user or entity requesting a particular playback of a media file. In a second column, a group 1004 is shown for a particular group for the user corresponding to requester ID 1002 and/or the media file, for example, a group that the user belongs to within an organization and/or a group that originated the recording for the media file. In a third column, a requested time 1006 corresponds to a playback time for each media file when accessed by the user corresponding to requester ID 1002. In a fourth column, a call duration 1008 designates a length or duration of a recording for the corresponding media file. In a fifth column, a screen resolution 1010 corresponds to a display screen resolution for a recorder of the corresponding media file, such as none where no video may be recorded and/or utilized or standard definition (SD), high definition (HD), full-HD (FHD), ultra-HD (UHD), or the like.

Four rows are shown in training metadata table 1000 in environment 200. Each row corresponds to a different playback of a media file that is used to train an AI model and system for predictive playback. For example, training metadata table 1000 includes a first row 1012, a second row 1014, a third row 1016, and a fourth row 1018. First row 1012 includes Alice for requester ID 1002, sales for group 1004, Sunday at 20:00 for requested time 1006, 5 minutes for call duration 1008, and HD for screen resolution 1010. Second row 1014 includes Bob for requester ID 1002, sales for group 1004, Sunday at 20:30 for requested time 1006, 7 minutes for call duration 1008, and FHD for screen resolution 1010. Third row 1016 includes Chris for requester ID 1002, legal for group 1004, Sunday at 18:30 for requested time 1006, 5 minutes for call duration 1008, and none for screen resolution 1010. Fourth row 1018 includes Bob for requester ID 1002, sales for group 1004, Sunday at 20:00 for requested time 1006, 10 minutes for call duration 1008, and none for screen resolution 1010. Moreover, each row may be identified by a particular segment ID or other media file ID that identified the particular media file.

Training metadata table 1000 may include numeric, categorical, and/or unstructured data. Numerical data may be processed without converting or otherwise modifying metadata prior to providing as input to an ML or a deep learning algorithm or technique. For example, a DNN may be capable of initially processing numerical data by making correlations between data and training different layers, which may be performed by providing different weights and connections between nodes of adjacent layers, as shown in FIG. 6. Where requester ID 1002 where call duration includes representative values, this data may include real number for processing. However, categorical data may correspond to one or more variables that may have different possible values, which are usually fixed and where the values are assigned within a category based on a qualitative property. Unstructured data may correspond to data that does not have a particular data model and is not organized in a particular manner that defined the values of the data. Thus, categorical data and/or unstructured data may be required to be converted to numerical representations prior to utilizing training metadata table 1000 for training of an AI model. For example, group 1004 may correspond to categorical and/or unstructured data. Requested time 1006 and/or screen resolution 1010 may correspond to numerical data where different dates, times, and/or screen resolutions are assigned alphanumeric identifiers or corresponding static data, may also corresponding to categorical and/or unstructured data that likewise is required to be processed.

Thus, a service provider, such as predictive playback service 120, may utilize one or more operations and processes to convert categorical or unstructured data to numerical representations for processing. In a first operation, embedding may be performed by utilizing autoencoders to convert raw data into real vectors in vector space. This may include mapping the qualitative similarities in the raw data into spatial Euclidean distances in the vector space. Embedding may include word and/or phrase embeddings to define data as numerical representations, for example, where a word may be converted into a vector for comparison to other words and vectors. Once the vectorization is performed, analysis of the vectors may be utilized through numerical representations of the words as vectors.

Additionally, one-hot encoding may be used to take categorical data and map the categorical data to values and numerical representations. One-hot encoding may be utilized to represent different states of a state machine, for example, by showing different decisions and resulting values. An exemplary table of words, and resulting table utilizing one-hot encoding to generate mapping of those words is shown as follows:

TABLE 1

| COLOR |
|---|
| Red |
| Red |
| Yellow |
| Green |
| Yellow |

TABLE 2

| RED | YELLOW | GREEN |
|---|---|---|
| 1 | 0 | 0 |
| 1 | 0 | 0 |
| 0 | 1 | 0 |
| 0 | 0 | 1 |
| 0 | 1 | 0 |

Figure 3:
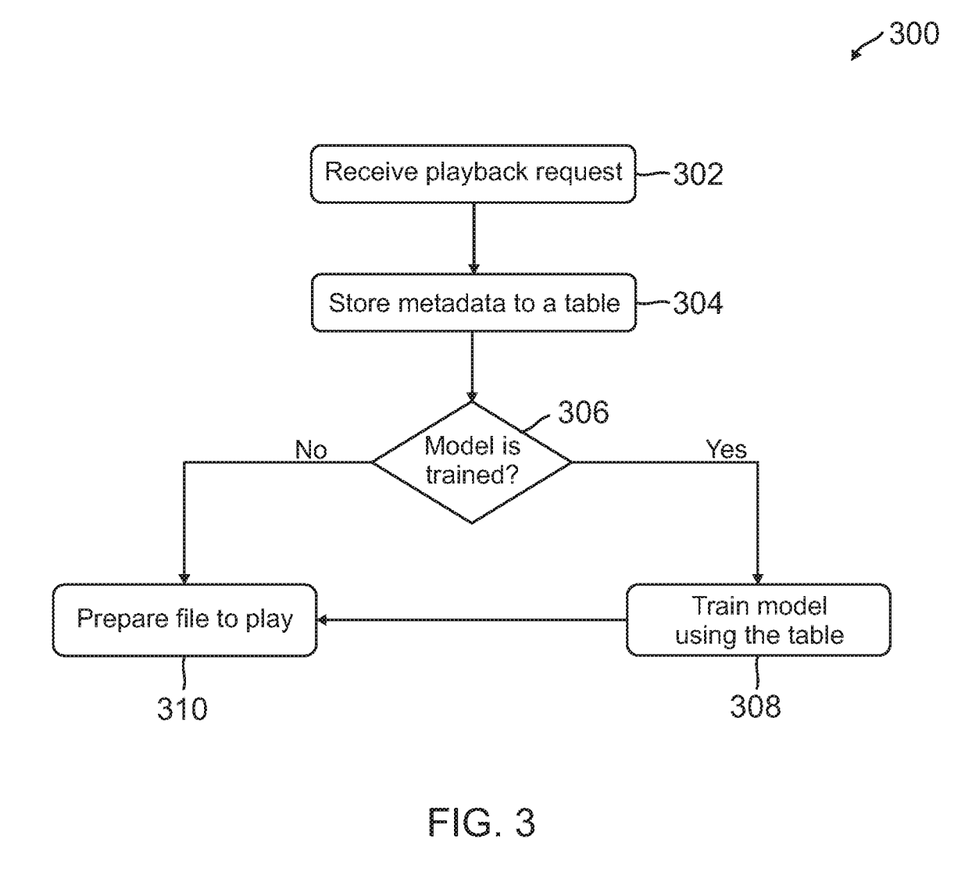
FIG. 3 is a simplified diagram of an exemplary process for training an AI model for a predictive playback AI system using requested playbacks according to some embodiments.

Once training metadata table 1000 is converted to corresponding vectors and/or numerical representations for training an AI model for predictive playback, the training data may be used to train the AI model, as shown in FIG. 3.

FIG. 3 is a simplified diagram of an exemplary process for training an AI model for a predictive playback AI system using requested playbacks according to some embodiments. Note that one or more steps, processes, and methods described herein of flowchart 300 may be omitted, performed in a different sequence, or combined as desired or appropriate. Flowchart 300 of FIG. 3 includes algorithmic processes to generate an AI model based on metadata for media file playbacks with a predictive playback system discussed in reference to environments 100 and 200 of FIG. 1 and FIG. 2, respectively.

Flowchart 300 shows the operations that may be utilized in training and updating an AI model for predictive playback of media files. In this regard, flowchart 300 may be utilized with training metadata table 1000 generated by members of a requesting entity, such as a customer, company, organization, or group of users that may utilize predictive playback service 120 for media file playback services. At an initial block 302 of flowchart 300, a playback request of media file is received. The playback request may correspond to a request to play a phone call or video conference call, which may require transcoding of the corresponding media file prior to playback. Transcoding of the media file may be time consuming and require processing resources. Thus, the user may not receive immediate playback of the media file.

In response to receiving the playback request, at block 304, metadata for the playback request is stored to a table. The playback request and corresponding media file may correspond to a data structure having metadata associated with generating, storing, and providing the media file and the playback of the media file. An exemplary set of metadata for a playback of a media file may correspond to first row 1012, second row 1014, third row 1016, and/or fourth row 1018 of training metadata table 1000. However, additional metadata for the playback of the media file may also be used, including participants to the recording of the media file, a time the recording started, a time the playback started, a number of playback hits for the media file, and the like. Thus, using this metadata from the data structure of the media file's playback, a table is generated and/or updated. Thus, the metadata used to train an AI model is then saved and stored to the table. This may include creating a training data table or updating a previously generated training data table with additional metadata for further requested and/or predicted playbacks.

At block 306, a determination is made of whether an AI model is trained using the metadata stored to the training data table. For example, the training data table may be used to initially train an AI model when desired for a particular requesting entity for media file playbacks. If the training data table and/or specific rows corresponding requested/predicted plays are utilized to train and/or update the model, flowchart 300 proceeds to block 308. At block 308, the AI model is trained using the training data table and corresponding metadata. The AI model may correspond to a DNN trained using one or more deep learning techniques and implementing one or more activation functions for weighting and connecting nodes of different layers. An exemplary NN is shown in FIG. 6. Thus, the metadata may be utilized as input values and nodes to train a DNN, where nodes within the hidden layer are then determined, weights or values are applied to those nodes. Those nodes are then connected to nodes in the next hidden layer and/or output layer, where backwards propagation may also be used for retraining. Once the AI model is trained, the AI model may be utilized for predictive operations, such as predicting whether a media file should be prepared prior to a potential playback. Thereafter, the media file that was requested to be played is prepared for playing, at block 310. Block 310 may include decompressing, decoding, and/or transcoding the media file into a playback format capable of being played by a media player on the requesting user's computing device.

However, specific metadata may be selectively utilized, and certain media files and corresponding metadata may not be used to train and/or update the AI model. For example, the metadata may be associated with a playback that is unrelated to predictions for future playbacks (e.g., the requester ID is omitted from training, the group for the media file is not utilized for predictions of potential future playbacks, and the like). In some embodiments, training of the AI model may correspond to updating the AI model based on additional requested and/or predicted playbacks and their corresponding metadata. Thus, where the playback request and/or media file for the playback request does not exceed a threshold or is omitted from updating the AI model, the metadata may not be used to train the AI model, and flowchart 300 may instead proceed from block 206 directly to block 310 where the media file is prepared to be played, for example, by decompressing and/or transcoding the media file, without training of the AI model.

Figure 4:
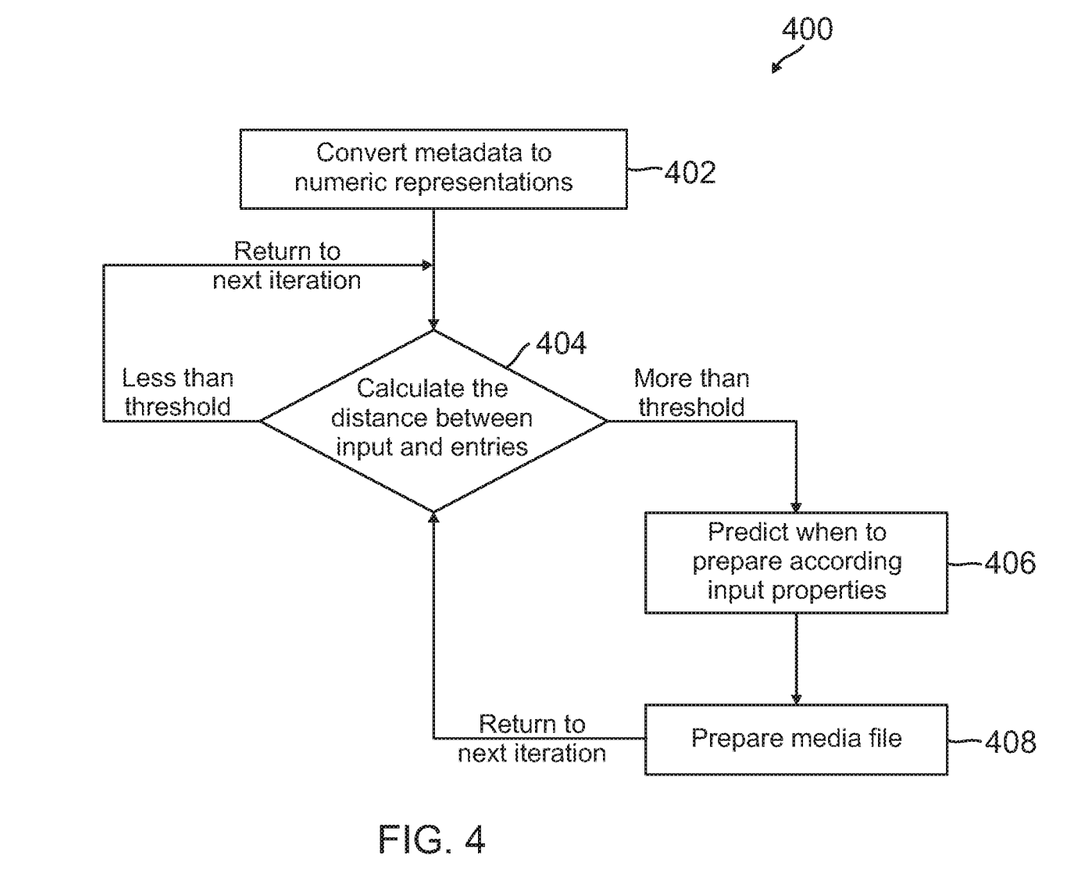
FIG. 4 is a simplified diagram of an exemplary process to predict requested playbacks of media using a predictive playback AI system according to some embodiments.

FIG. 4 is a simplified diagram of an exemplary process to predict requested playbacks of media using a predictive playback AI system according to some embodiments. Note that one or more steps, processes, and methods described herein of flowchart 400 may be omitted, performed in a different sequence, or combined as desired or appropriate. Flowchart 400 of FIG. 4 includes AI processes to predictively prepare a media file for playback using the predictive playback AI model and system discussed in reference to environments 100, 200, and 300 of FIG. 1, FIG. 2, and FIG. 3, respectively.

Flowchart 400 shows the operations that may be performed to determine whether a media file is predictively prepared for a future playback that may be requested by a user or another entity. In this regard, flowchart 400 may be performed at specific time intervals, such as once per hour, day, or week, which may depend on the preferences, resources, and cost associated with processing the media files using a predictive playback AI system, as well as preparing/storing media files in an uncompacted format for immediate playback. Thus, when the time interval occurs, each media file that may be analyzed for predictive playback is iterated through using the predictive playback AI system. At block 402, metadata for one or more media file is converted to numeric representations, such as by using embeddings for words, phrases, or the like and/or one-hot encoding, which convert categorical and/or unstructured data within the metadata to numerical representations. Thereafter, using vectors and other numerical representations of the metadata, the converted metadata may be used as input to trained AI model 132.

Using trained AI model 132, at block 404, the distance between the input and the entries is calculated for a selected media file's metadata and compared to a threshold required for predicting a playback of the selected media file, and therefore preparing the media file for playback in a predictive manner (e.g., before a predicted playback time and/or date). If, at block 404, the calculated distance or score does not exceed the threshold, flowchart 400 returns to the next iteration of a media file from the media files having metadata converted to numerical representations. Thus, flowchart 400 iterates through the media files and corresponding metadata using trained AI model 132 to find other media files that may be predictively prepared for playback at a future time.

However, if at block 404, the media file is predicted for playback based on the calculated distance or score meeting or exceeding the threshold, flowchart 400 proceeds to 406, where a time for preparation of the media file is predicted according to input properties of the media file. For example, the input properties may include metadata for a requester ID, a group, participants to the media file, a call duration, and/or a screen resolution, or any combination thereof. Where the media file has previously been played back, the media file may also include metadata for a time of one or more previous playbacks, a number of hits or playbacks, and the like. The predicted time may be based on one or more of these factors, including determining an earliest time of previous playbacks by the requester ID, members of the group, participants to the media file, or any combination thereof. Furthermore, using the other input properties and metadata, the predicted time for future playback may be determined from other similar media files having similar attributes (e.g., length, screen resolution, and the like).

A time for preparation may also be based on an amount of time required for transcoding or otherwise preparing the media file, including required decompression and/or transcoding, a file size and/or recording length, a screen resolution, or any combination thereof. This may correspond to an amount of time required to prepare the media file, and therefore affect the predicted time to prepare. For example, where the media file may be large, a significant amount of time may be required to prepare the media file, thereby adjusting the predicted time to prepare. Thereafter, at block 408, the media file is prepared. This may include decompressing, decoding, transcoding, or otherwise preparing the media file for playback using a media player. The media file may also be prepared for playback using two or more different media players, such as an on-device application or a web application media player. Once prepared, flowchart 400 returns to block 404 where flowchart 400 then iterates through the next media file and corresponding metadata using trained AI model 132.

Figure 5:
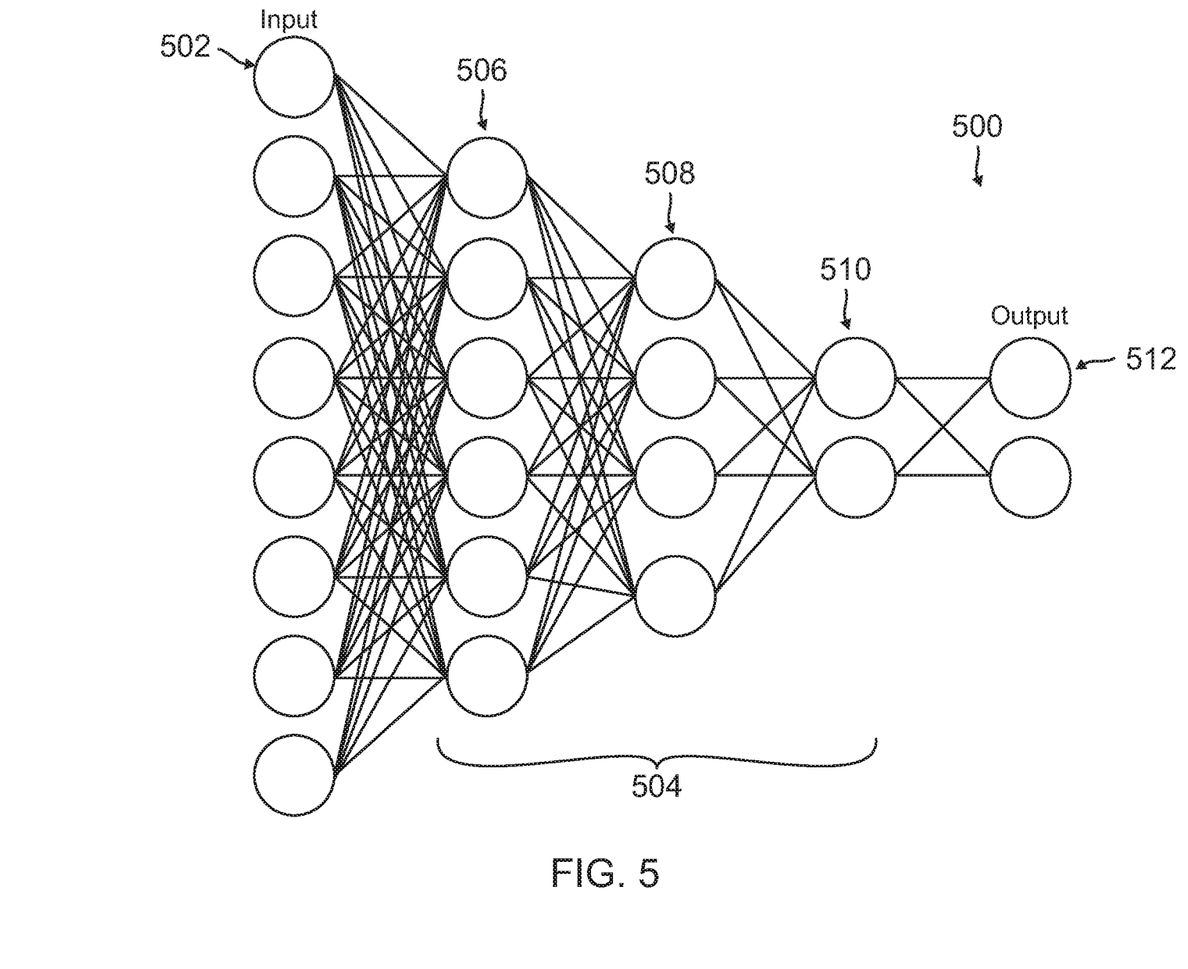
FIG. 5 is a simplified diagram of different layers of an AI model trained for predictive playback according to some embodiments.

FIG. 5 is a simplified diagram of different layers of an AI model trained for predictive playback according to some embodiments. FIG. 5 includes a neural network 500, such as a trained DNN for predictive playback of media files that may be requested by users at a future playback time. As shown, neural network 500 includes three groupings of layers—an input layer 502, hidden layers 504, and an output layer 512 having one or more nodes, however, different layers may also be utilized. For example, although three layers are shown in hidden layers 504, neural network 500 may include less or as many hidden layers as necessary or appropriate.

These nodes are connected to nodes in an adjacent layer. In this example, neural network 500 receives a set of input values and produces one or more output values, for example, in the case of predictive playback analysis to determine whether a media file is to be prepared for playback at a designated future time, "prepare" or "do not prepare." The outputs may correspond to a score and threshold required for output classification. However, different, more, or less outputs may also be provided based on the training. When neural network 500 is used to, each node in the input layer may correspond to a distinct attribute or input data type derived from the training data collected from past playbacks of media files 126 by users of predictive playback service 120. In a non-limiting example, the input nodes may include requester ID 1002, group 1004, requested time 1006, call duration 1008, and screen resolution 1010.

In some embodiments, each of the nodes in the hidden layer generates a representation, which may include a mathematical computation (or algorithm) that produces a value based on the input values of the input nodes. The mathematical computation may include assigning different weights to each of the data values received from the input nodes. The hidden layer nodes may include different algorithms and/or different weights assigned to the input data and may therefore produce a different value based on the input values. Hidden layers 504 includes three hidden layers, a first hidden layer 506, a second hidden layer 508, and a third hidden layer 510. Each node in a hidden layer may be connected to the nodes in the adjacent hidden layer such that nodes from input layer 502 may be connected to nodes in first hidden layer 506, nodes in first hidden layer 506 may be connected to nodes in second hidden layer 508, nodes in second hidden layer 508 may be connected to nodes in third hidden layer 510, and nodes in third hidden layer 510 may be connected to nodes and corresponding outputs in output layer 512. The values generated by the hidden layer nodes may be used by the output layer node to produce an output value for neural network 500. When neural network 500 is used to determine playback predictions of media files, the output values produced by neural network 500 may indicate a likelihood that media file may be requested for playback from one or more users, groups, or the like.

Neural network 500 may be trained by using training data, including training metadata table 1000, which may also be prepared by converting data to numerical representations and vectors. By providing training data to neural network 500, the nodes in hidden layers 504 may be trained (adjusted) such that an optimal output (e.g., a classification) is produced in the output layer based on the training data. By continuously providing different sets of training data and penalizing neural network 500 when the output of neural network 500 is incorrect (e.g., when the correct media files are not determined or prepared by neural network 500), neural network 500 (and specifically, the representations of the nodes in the hidden layer) may be trained (adjusted) to improve its performance in data classification. Adjusting neural network 500 may include adjusting the weights associated with each node in the hidden layer.

FIG. 6 is an exemplary flowchart for an AI model for predicting playback of media data according to some embodiments. In some embodiments, generation and utilization of an AI model trained for predictive playback described in method 600 of FIG. 6 can be implemented and performed using an online service provider system, such as predictive playback service 120. One or more of the processes 602-618 of method 600 may be implemented, at least in part, in the form of executable code stored on non-transitory, tangible, machine-readable media that when run by one or more processors may cause the one or more processors to perform one or more of the processes 602-618. In some embodiments, method 600 can be performed by one or more computing devices in environment 100 of FIG. 1.

At step 602, a playback request for media files is received. The playback request may correspond to one or more user of a requesting entity (e.g., a customer, user or group of users, etc.) of a service provider that requests one or more media files to be prepared for streaming or downloading to the user's device. The service provider may correspond to a media service provider that provides media services including recording, storing, and providing media content. For example, the service provider may record, for storage and later use, phone calls, video teleconferences, video streams and recordings, media sharing of user content, or any combination thereof. Once requested, the service provider may prepare media files, for example, by decompressing, transcoding, or otherwise making available for playback through a media player.

Based on the requested media files for playback, the service provider may select media files and metadata for AI model training, at step 604. The metadata may include the data associated with generating, storing, and/or playing media files, including generating the requested playbacks of media files. Thereafter, at step 606, the metadata is converted to numerical representations. Numerical representations of the metadata may include data that may be utilized by an AI algorithm and/or technique, such as a deep learning technique for a DNN, which may train an AI model. For example, one or more operations for converting data into numerical representations may include embeddings for words, phrases, and the like and/or one-hot encoding for converting categorical and/or unstructured data to array data.

Once the numerical representations are determined, a deep learning technique may be used to generate a DNN with one or more hidden layers providing output in an output layer from inputs in an input layer. Thus, at step 608, the AI model for playback prediction is trained using the converted metadata. When training the DNN, one or more activation functions may be utilized with calculating and adjusting the nodes of the DNN, including a ReLU function, a leaky ReLU function, a TanH function, or a combination thereof. Moreover, loss may be calculated using probabilities metrics, such as KL-divergence or Bhattacharyya distance. Thereafter, the model may also be updated and retrained using data from transfer learning of additional models and their input/output data.

At step 610, at selected time periods, media files for potential future playback are accessed. The time periods may be designated by the requesting entity utilizing playback services of the service provider, or by the service provider in general. For example, the time period may be based on cost and processing/storage resources used for determining the predictive playbacks of media files and preprocessing/preparing the media files. At step 612, predictive scores the designate whether the media files may be requested for playback are generated using the metadata of the media files and the trained AI model. In an exemplary embodiment, the metadata may include a requester ID or name, a participant list, a screen resolution, a time duration, and a time the recording started. However, less, more, or other metadata may also be utilized to perform a predictive playback. This may be converted to numerical representations and utilized as input to the trained AI model. In the above exemplary embodiment, the five attributes may be converted to a particular input vector with a number of dimensions, which may then be compared to other vectors using the trained AI model.

At step 614, a media file that may be requested for playback is predicted based on comparing the predictive scores to a threshold. The threshold may also be designed by the requesting entity and/or service provider based on cost and processing/storage resources used for preparing the media files and temporarily storing the prepared media files for use. The media file is prepared for playback before a predicted playback time, at step 616. The predicted playback time may correspond to a time determined from the input metadata of the media file, which may be compared to other request times for particular requester IDs, groups, and the like. The media file may be prepared by decompressing, transcoding, or otherwise preparing the media file by the predicted playback time. Further, at step 618, based on the predicted playback, the AI model is retrained using the metadata for the predicted playback. For example, the metadata may be added to a table of training data, which may then be used for retraining of node weights and connections within the DNN. The retraining may be performed in a similar manner to training the DNN using the training metadata table and converted metadata.

As discussed above and further emphasized here, FIGS. 1, 2, 3, 4, 5, and 6 are merely examples of predictive playback service 120 and corresponding methods for predictive playback of media files, which examples should not be used to unduly limit the scope of the claims. One of ordinary skill in the art would recognize many variations, alternatives, and modifications.

Figure 7:
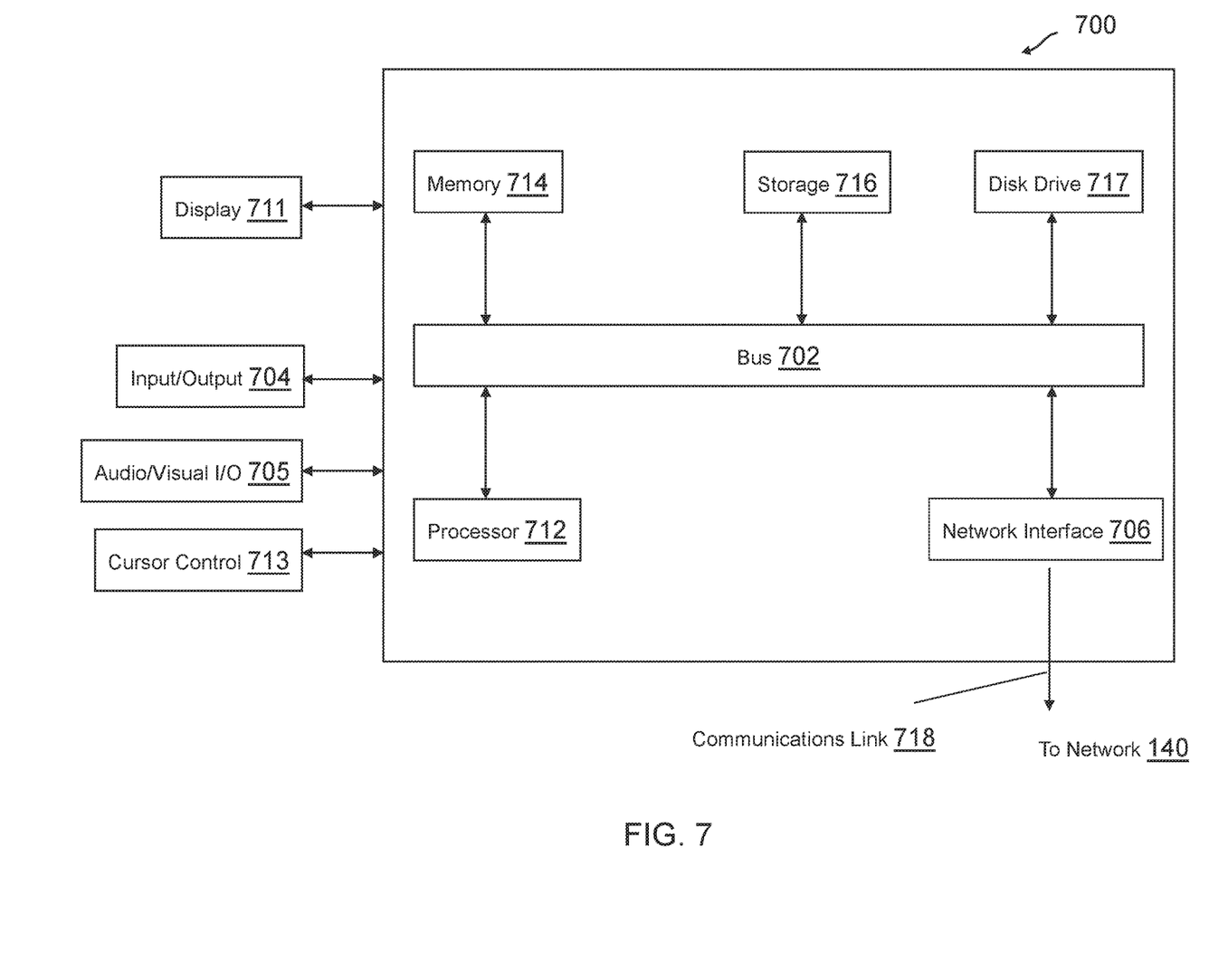
FIG. 7 is a simplified diagram of a computing device according to some embodiments.

FIG. 7 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 700 in a manner as follows.

Computer system 700 includes a bus 702 or other communication mechanism for communicating information data, signals, and information between various components of computer system 700. Components include an input/output (I/O) component 704 that processes a user action, such as selecting keys from a keypad/keyboard, selecting one or more buttons, image, or links, and/or moving one or more images, etc., and sends a corresponding signal to bus 702. I/O component 704 may also include an output component, such as a display 711 and a cursor control 713 (such as a keyboard, keypad, mouse, etc.). An optional audio/visual input/output component 705 may also be included to allow a user to use voice for inputting information by converting audio signals. Audio/visual I/O component 705 may allow the user to hear audio, and well as input and/or output video. A transceiver or network interface 706 transmits and receives signals between computer system 700 and other devices, such as another communication device, service device, or a service provider server via network 150. In one embodiment, the transmission is wireless, although other transmission mediums and methods may also be suitable. One or more processors 712, which can be a micro-controller, digital signal processor (DSP), or other processing component, processes these various signals, such as for display on computer system 700 or transmission to other devices via a communication link 718. Processor(s) 712 may also control transmission of information, such as cookies or IP addresses, to other devices.

Components of computer system 700 also include a system memory component 714 (e.g., RAM), a static storage component 716 (e.g., ROM), and/or a disk drive 717. Computer system 700 performs specific operations by processor(s) 712 and other components by executing one or more sequences of instructions contained in system memory component 714. Logic may be encoded in a computer readable medium, which may refer to any medium that participates in providing instructions to processor(s) 712 for execution. Such a medium may take many forms, including but not limited to, non-volatile media, volatile media, and transmission media. In various embodiments, non-volatile media includes optical or magnetic disks, volatile media includes dynamic memory, such as system memory component 714, and transmission media includes coaxial cables, copper wire, and fiber optics, including wires that comprise bus 702. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 700. In various other embodiments of the present disclosure, a plurality of computer systems 700 coupled by communication link 718 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications of the foregoing disclosure. Thus, the scope of the present application should be limited only by the following claims, and it is appropriate that the claims be construed broadly and in a manner consistent with the scope of the embodiments disclosed herein.

What is claimed is:

1. An artificial intelligence (AI) system configured to predict requested playbacks of media files by users from a media storage system, the AI system comprising:
a processor and a computer readable medium operably coupled thereto, the computer readable medium comprising a plurality of instructions stored in association therewith that are accessible to, and executable by, the processor, to perform predictive playback operations which comprise:
accessing an AI model trained to predict the requested playbacks of the media files prior to the requested playbacks, wherein the AI model is trained using training data comprising historical records of previous playbacks of past media files by one or more of the users;
accessing a first media file of the media files from a call interaction with a call center system, wherein the first media file comprises first metadata associated with generating the first media file with the media storage system, and wherein the first media file is in an encoded format that is compressed for storage;
determining, from the first metadata, interaction attributes associated with a number of dimensions of vectors that are output by the AI model from the training data;
generating, a first predictive score comprising a first vector in a vector space associated with an output by the AI model, wherein the first predictive score is for a first playback of the first media file by one of the users;
comparing the first predictive score to a threshold required to transcode the first media file into a playback format prior to the first playback using a distance between the first vector for the first predictive score and a second vector for the threshold, wherein the threshold is based on a mean average score determined by the AI model for the historical records;
predicting the first playback of the first media file by the one of the users based on the comparing;
determining a predicted playback time of the first media file by the one of the users based on the first metadata for the first media file; and
transcoding the first media file from the encoded format to the playback format prior to the predicted playback time.

2. The AI system of claim 1, wherein, before accessing the AI model, the predictive playback operations further comprise:
selecting a plurality of the media files associated with the previous playbacks by the one or more of the users, wherein the selected plurality of the media files comprise selected media file metadata associated with the selected plurality of the media files stored by the media storage system; and
training the AI model based on the selected media file metadata for the selected plurality of the media files.

3. The AI system of claim 2, wherein training the AI model uses a data table representing the selected media file metadata for the selected plurality of the media files, and wherein training the AI model further uses an AI model architecture and a loss function.

4. The AI system of claim 3, wherein the data table representing the selected media file metadata comprises at least a portion of the historical records that include at least one of one or more unique identifiers for the one or more of the users associated with the previous playbacks, segment identifiers for the selected plurality of the media files, a participant list for the selected plurality of the media files, recording information for the selected plurality of the media files, a request type for the previous playbacks, or requested playback times for the previous playbacks.

5. The AI system of claim 3, wherein the AI model architecture comprises a deep neural network utilizing at least one activation function corresponding to a rectified linear unit (ReLU) function, a leaky ReLU function, a TanH function, or a combination thereof.

6. The AI system of claim 2, wherein the predictive playback operations further comprise:

in response to predicting the first playback and determining the predicted playback time, retraining the AI model using the first metadata and at least one of the predicted playback time or an actual playback time of the transcoded first media file.

7. The AI system of claim 2, wherein, before training the AI model, the predictive playback operations further comprise:
converting the selected media file metadata to the vectors using at least one of embeddings or one-hot encoding, wherein training the AI model is further based on the converted selected media file metadata.

8. The AI system of claim 1, wherein the predictive playback operations further comprise:
accessing a second media file of the media files, wherein the second media file comprises second metadata associated with generating the second media file with the media storage system;
generating a second predictive score for a second playback of the second media file based on the AI model and the second metadata for the second media file;
comparing the second predictive score to the threshold required to transcode the second media file into the playback format prior to the second playback; and
predicting that the second playback of the second media file will not occur based on the comparing, wherein the AI model is not updated based on the second metadata.

9. The AI system of claim 1, wherein the threshold is configurable based on a storage capacity of a playback requester entity associated with the media files, and wherein the media files are accessed for predicting the requested playbacks at a time interval designated by the playback requester entity.

10. A method to predict requested playbacks of media files by users from a media storage system, the method comprising:
accessing an artificial intelligence (AI) model trained to predict the requested playbacks of the media files prior to the requested playbacks, wherein the AI model is trained using training data comprising historical records of previous playbacks of past media files by one or more of the users;
accessing a first media file of the media files from a call interaction with a call center system, wherein the first media file comprises first metadata associated with generating the first media file with the media storage system, and wherein the first media file is in an encoded format that is compressed for storage;
determining, from the first metadata, interaction attributes associated with a number of dimensions of vectors that are output by the AI model from the training data;
generating, a first predictive score comprising a first vector in a vector space associated with an output by the AI model, wherein the first predictive score is for a first playback of the first media file by one of the users;
comparing the first predictive score to a threshold required to transcode the first media file into a playback format prior to the first playback using a distance between the first vector for the first predictive score and a second vector for the threshold, wherein the threshold is based on a mean average score determined by the AI model for the historical records;
predicting the first playback of the first media file by the one of the users based on the comparing;
determining a predicted playback time of the first media file by the one of the users based on the first metadata for the first media file; and
transcoding the first media file from the encoded format to the playback format prior to the predicted playback time.

11. The method of claim 10, wherein, before accessing the AI model, the method further comprises:
selecting a plurality of the media files associated with the previous playbacks by the one or more of the users, wherein the selected plurality of the media files comprise selected media file metadata associated with the selected plurality of the media files stored by the media storage system; and
training the AI model based on the selected media file metadata for the selected plurality of the media files.

12. The method of claim 11, wherein training the AI model uses a data table representing the selected media file metadata for the selected plurality of the media files, and wherein training the AI model further uses an AI model architecture and a loss function.

13. The method of claim 12, wherein the data table representing the selected media file metadata comprises at least a portion of the historical records that include at least one of one or more unique identifiers for the one or more of the users associated with the previous playbacks, segment identifiers for the selected plurality of the media files, a participant list for the selected plurality of the media files, recording information for the selected plurality of the media files, a request type for the previous playbacks, or requested playback times for the previous playbacks.

14. The method of claim 12, wherein the AI model architecture comprises a deep neural network utilizing at least one activation function corresponding to a rectified linear unit (ReLU) function, a leaky ReLU function, a TanH function, or a combination thereof.

15. The method of claim 11, wherein the method further comprises:
in response to predicting the first playback and determining the predicted playback time, retraining the AI model using the first metadata and at least one of the predicted playback time or an actual playback time of the transcoded first media file.

16. The method of claim 11, wherein, before training the AI model, the method further comprises:
converting the selected media file metadata to the vectors using at least one of embeddings or one-hot encoding, wherein training the AI model is further based on the converted selected media file metadata.

17. The method of claim 10, wherein the method further comprises:
accessing a second media file of the media files, wherein the second media file comprises second metadata associated with generating the second media file with the media storage system;
generating a second predictive score for a second playback of the second media file based on the AI model and the second metadata for the second media file;
comparing the second predictive score to the threshold required to transcode the second media file into the playback format prior to the second playback; and
predicting that the second playback of the second media file will not occur based on the comparing, wherein the AI model is not updated based on the second metadata.

18. The method of claim 10, wherein the threshold is configurable based on a storage capacity of a playback requester entity associated with the media files, and wherein the media files are accessed for predicting the requested playbacks at a time interval designated by the playback requester entity.

19. A non-transitory computer-readable medium having stored thereon computer-readable instructions executable to predict requested playbacks of media files by users from a media storage system, the computer-readable instructions executable to perform predictive playback operations which comprises:

accessing an artificial intelligence (AI) model trained to predict the requested playbacks of the media files prior to the requested playbacks, wherein the AI model is trained using training data comprising historical records of previous playbacks of past media files by one or more of the users;

accessing a first media file of the media files from a call interaction with a call center system, wherein the first media file comprises metadata associated with generating the first media file with the media storage system, and wherein the first media file is in an encoded format that is compressed for storage;

determining, from the metadata, interaction attributes associated with a number of dimensions of vectors that are output by the AI model from the training data;

generating, a first predictive score comprising a first vector in a vector space associated with an output by the AI model, wherein the first predictive score is for a first playback of the first media file by one of the users;

comparing the first predictive score to a threshold required to transcode the first media file into a playback format prior to the first playback using a distance between the first vector for the first predictive score and a second vector for the threshold, wherein the threshold is based on a mean average score determined by the AI model for the historical records;

predicting the requested playback of the media file by the one of the users based on the comparing;

determining a predicted playback time of the media file by the one of the users based on the metadata for the media file; and transcoding the media file from the encoded format to the playback format prior to the predicted playback time.

20. The non-transitory computer-readable medium of claim 19, wherein the predictive playback operations further comprise:

selecting a plurality of the media files associated with the previous playbacks by the one or more of the users, wherein the selected plurality of the media files comprise selected media file metadata associated with the selected plurality of the media files stored by the media storage system; and training the AI model based on the selected media file metadata for the selected plurality of the media files.

\* \* \* \* \*